Patented Aug. 29, 1933

1,924,774

UNITED STATES PATENT OFFICE 1,924,774

PRODUCTION OF DYESTUFFS AND INTERMEDIATES

David Alexander Whyte Fairweather and John Thomas, Grangemouth, Scotland, assignors to Scottish Dyes Limited, Grangemouth, Scotland No Drawing. Application February 6, 1930, Serial No. 426,417, and in Great Britain February 8, 1929

15 Claims. (Cl. 260—86)

This invention relates to the production of azo dyestuffs and intermediates.

The object of the present invention is to provide improved or modified azo dyestuffs and intermediates or improved or modified processes for making or using azo dyestuffs and intermediates.

In a co-pending application corresponding to British application No. 4328/29, (Serial No. 423179, filed 24th January 1930) there are described processes for using certain products. The present application deals with methods for producing starting materials which may be used for the purposes of the processes of the aforesaid copending application.

As a result of researches we have found among other things that β amino anthraquinone disulphuric acid ester, when treated with sodium nitrite, can be converted to the diazo derivative. This is a most surprising result in view of the fact that these esters are normally oxidized and hydrolyzed by sodium nitrite in acid solution. The resulting diazo body we also find will couple with amines, phenols or the like; in fact it appears to behave just like an ordinary diazo body.

The resulting coupled products may be used as dyestuffs and for example will dye vegetable or animal fibres. By treatment with acid oxidizing agents the ester groups are apparently hydrolyzed and oxidized to give the azo body on the fibre.

Using this important discovery as a basis we have found that we can provide a range of products for dyeing which are not in fact vat dyestuffs. The matter appears to be comprehensive, and to include for instance the diazotization of esters containing amino groups, and the coupling of the diazotized bodies with the usual azo dyestuffs components, such as amines, phenols or the like.

With regard to the esters, carboxylic acid esters containing amino groups as diazo components have been proposed for use in the manufacture of azo dyestuffs for a long time, but the esters used as starting materials for the processes of the present application are sulphuric esters of amino anthrahydroquinones.

We have found that coupling may be carried out in acid, alkaline or neutral solution according to the components employed.

The following examples illustrate how the invention may be carried into effect the principal features being later indicated by the claims, references to parts being to parts by weight:—

Example 1

42.9 parts of the sodium salt of beta-amino-anthrahydroquinone disulphuric acid ester are dissolved in water and ice added until the temperature is at 0° C. 30 parts of hydrochloric acid of specific gravity 1.16 are now added and the solution of the hydrochloride of beta-amino-anthrahydroquinone disulphuric acid ester so obtained diazotized by the slow addition of 6.9 parts of sodium nitrite in aqueous solution, the temperature being kept below 5° by the addition of a further quantity of ice if necessary. The diazo anthrahydroquinone disulphuric acid ester may be filtered off, or its solution or suspension may be used for further reactions without isolation.

The structural formula of the product is:—

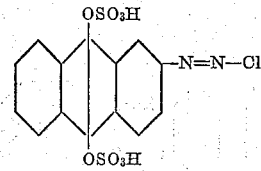

Example 2

The solution or suspension of beta-diazo-anthrahydroquinone disulphuric acid ester obtained in Example 1 is run slowly with stirring into an alkaline solution of beta naphthol prepared from 14.5 parts beta naphthol and 10 parts caustic soda at ordinary temperature. The alkaline mixture is stirred for one hour and then warmed to complete the reaction. The dyestuff is salted out and filtered off.

The structural formula of the product is:—

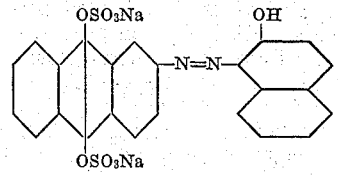

Example 3

42.9 parts of the sodium salt of beta-amino-anthrahydroquinone disulphuric acid ester are diazotized as in Example 1 and the solution or suspension so obtained is run slowly with stirring into an alkaline solution of 5-chlor-orthotoluidide of beta-hydroxy-naphthoic acid made from 31.5 parts of 5-chlor-orthotoluidide of beta-hydroxy-naphthoic acid and 10 parts of caustic soda as in Example 1. The mixture is stirred for one hour at ordinary temperature and then warmed and the dyestuff salted out.

The structural formula of the product is:—

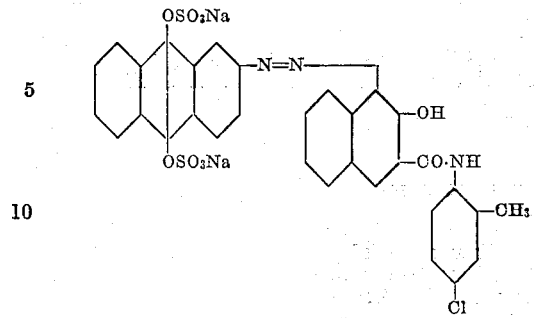

Example 4

The diazonium salt prepared as in Example 1 from 42.9 parts of the sodium salt of beta-amino-anthrahydroquinone disulphuric acid ester is introduced at 5° C. into an aqueous solution of 22 parts of the sodium salt of 1:5 amino naphthoic acid to which has been added 30 parts of sodium acetate. The mixture is stirred at 5° C. for 1 hour, and then the temperature is allowed to rise to 15° C. When the coupling is complete the mixture is warmed and the dark orange dyestuff salted out.

The structural formula of the product is:—

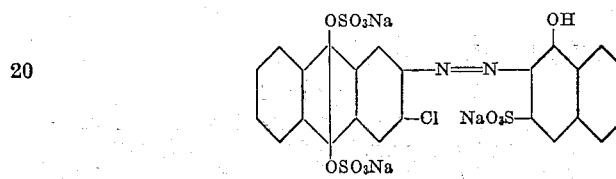

Example 5

495 parts of the potassium salt of 2-animo-3-chlor-anthrahydroquinone disulphuric ester are dissolved in hot water and cooled to 0° with stirring. The solution is made acid to litmus. 300 parts of 36% hydrochloric acid are then added, followed by 69 parts of sodium nitrite added fairly rapidly as the diazotization proceeds. The diazo solution is stirred into a cold solution containing 166 parts of sodium beta-naphtholate and 350 parts of sodium carbonate.

After stirring until coupling is complete, the dyestuff is salted out by the addition of common salt.

The structural formula of the product is:—

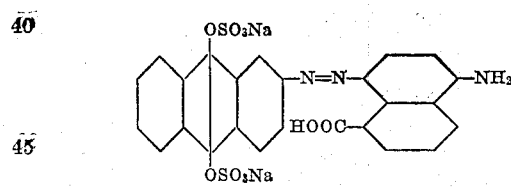

The product is bluish-violet in color and is converted to orange on acid oxidation.

Example 6

If the diazo solution obtained as in Example 5 from 495 parts of the potassium salt of 2-amino-3-chlor-anthrahydroquinone-9:10-disulphuric ester is similarly combined with a solution containing 252 parts of 5:5'-dihydroxy-2:2'-dinaphthyl-urea-7:7'-disulphonic acid in presence of 350 parts of sodium carbonate, there is obtained a brownish-violet dyestuff converted to red by acid oxidation.

The structural formula of the brownish-violet dyestuff is:—

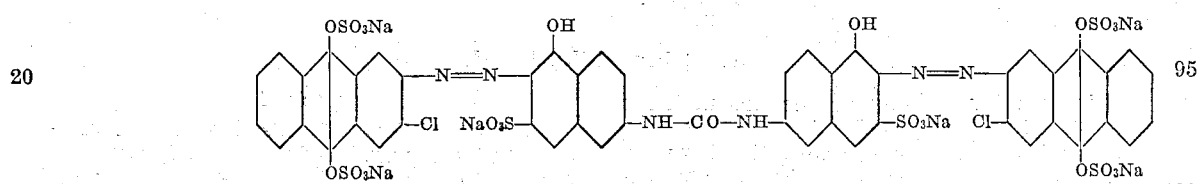

Example 7

To the diazo solution obtained as described in either of the two preceding examples, using 495 parts of the ester, 300 parts of 36% hydrochloric acid and 69 parts of sodium nitrite, there is added a solution containing 239 parts of 2-amino-8-naphthol-6-sulphonic acid and 250 parts of sodium acetate crystals. The mixture is stirred until combination is complete, when it is made alkaline and the dyestuff is salted out with common salt.

The structural formula of the product is:—

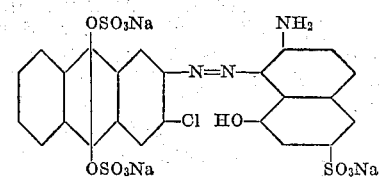

Example 8

To the diazo solution obtained from 495 parts of the potassium salt of 2-amino-3-chlor-anthrahydroquinone-9:10-disulphuric ester, 300 parts of 36% hydrochloric acid and 69 parts of sodium nitrite, there is added a solution of the hydrochloride obtained from 137 parts of meta-amino-para-cresol-methyl-ether together with 300 parts of sodium acetate crystals.

The mixture, which is free from mineral acid, is stirred until coupling is complete and is then neutralized. The resulting amino azo dyestuff is now diazotized by the addition of 69 parts of 36% hydrochloric acid and the suspension of diazo compound is then stirred into a cold solution containing 337 parts of the sodium salt of 2-phenyl-amino-5-naphthol-7-sulphonic acid and 400 parts of sodium carbonate.

After stirring the mixture, meanwhile maintaining it alkaline with sodium carbonate until coupling is complete, the dyestuff is salted out by the addition of common salt.

The structural formula of the product is:—

[Structural formula with OSO₃Na, CH₃, Cl, OCH₃, OH, NHC₆H₅, NaO₃S groups connected by -N=N- linkages]

Example 9

A neutral solution of 319 parts of 1:8-amino-naphthol-3:6-disulphonic acid is stirred into the diazo solution obtained as already described from 495 parts of the potassium salt of 2-amino-3-chlor-anthrahydroquinone-9:10-disulphuric ester, 300 parts of 36% hydrochloric acid and 69 parts of sodium nitrite. When coupling is complete the mixture is made neutral and 400 parts of sodium carbonate are added. There is then run in with continuous stirring a solution of benzene diazonium chloride obtained from 93 parts of aniline in the known manner. When combination is complete, the dyestuff is precipitated by the addition of common salt.

The structural formula of the product is:—

[Structural formula with OSO₃Na, NH₂, OH, Cl, NaO₃S, SO₃Na groups connected by -N=N- linkages]

It is a violet body, turning to blue on acid oxidation.

Example 10

154 parts of 4-nitro-2-amino-phenol are diazotized and combined with 108 parts of meta-phenylene-diamine in known manner. To the amino azo dyestuff thus produced there is added with constant stirring the acid solution obtained from 495 parts of the potassium salt of 2-amino-3-chlor-anthrahydroquinone-9:10-disulphuric ester as already described and at the same time sufficient aqueous ammonia to maintain the coupling mixture alkaline throughout.

When combination is complete the dyestuff is isolated by the addition of common salt.

The structural formula of the product is:—

[Structural formula with OSO₃Na, NH₂, Cl, OH, NO₂ groups connected by -N=N- linkages]

Example 11

This describes the diazotization of 1-amino-anthrahydroquinone-disulphuric acid ester which is carried out in the similar manner to that of the corresponding 2-amino-derivative in Example 1.

The structural formula of the product is:—

[Structural formula with OSO₃Na groups and N=N—Cl]

An example of a product obtained by coupling this will be found in the table below.

Example 12

This is an example of the preparation of a diazo solution from 2-amino-1-chlor-anthrahydroquinone-disulphuric acid ester.

This preparation is carried out in the same way as is described in Example 5.

The structural formula of the product is:—

[Structural formula with OSO₃Na, Cl groups and N=N—Cl]

An example of a product obtained by coupling this will be found in the table below.

Example 13

This is an example of the diazotization of a diamino-anthrahydroquinone ester.

44.4 parts of the sodium salt of 2:6-diamino-anthrahydroquinone-9:10-disulphuric acid ester are dissolved in water and cooled to 0° C. with ice.

60 parts of concentrated hydrochloric acid are then added and the tetrazotization carried out with a solution of 13.8 parts of sodium nitrite which is added rapidly with good stirring.

This solution can then be used for coupling, for example for the production of a product such as is mentioned in the table below.

The structural formula of the uncoupled product is:—

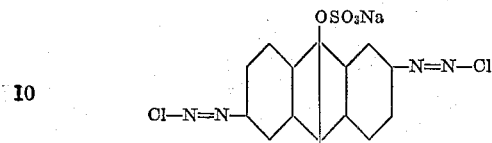

The structural formula of the product is:—

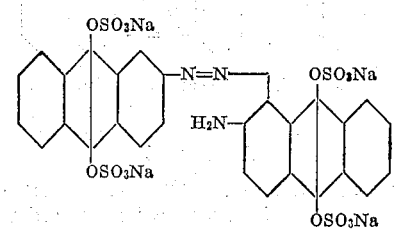

Example 14

This is an example of the use of a body of indigoid type.

63 parts of the sodium salt of 5:5′-dichlor-7:7′-diamino-leuco-thio-indigo-disulphuric ester (made by the action of a metal, pyridine and pyridine sulphuric anhydride on 5:5′-dichlor-7:7′-di-acetyl-amino-thioindigo with subsequent alkali treatment) in solution in water are acidified at 0° with 60 parts of concentrated hydrochloric acid and tetrazotized by the rapid addition of 13.8 parts of sodium nitrite in solution.

The clear dark brown solution contains the tetrazo body.

The structural formula of the product is:—

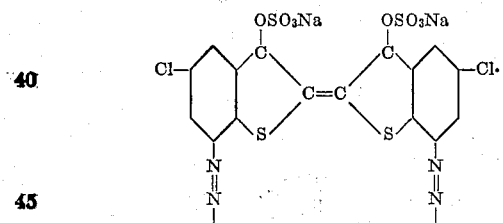

An example of a product obtained by coupling this will be found in the table below.

Example 15

This is an example of the formation of an amino azo derivative.

A solution containing 42.9 parts of the sodium salt of beta-amino-anthrahydroquinone-9:10-disulphuric acid ester made by alkaline hydrolysis of the corresponding acetyl amino ester, and therefore containing also in solution one molecular equivalent of sodium acetate, is neutralized with hydrochloric acid. Thereafter 30 parts of concentrated hydrochloric acid are added at 0° C. and the solution treated with 3.45 parts of sodium nitrite in solution.

The bright red color of the diazo compound gradually disappears and the solution acquires a bluish color. When all the diazo compound has disappeared, which takes place after some hours' stirring at room temperature, the beta-amino-alpha-beta-azo-anthrahydroquinone-tetra-sulphuric acid ester may be salted out or its solution may be used for further reactions.

Example 16

The solution obtained in the last example is treated with 24 parts of hydrochloric acid and 3.5 parts of sodium nitrite at 0° C. The diazo solution so obtainable is added slowly with stirring to a cold solution of 14 parts of the toluidide of beta-hydroxy-naphthoic acid in 470 parts of 3% caustic soda. The mass is stirred at ordinary temperature for one hour and is then warmed to 50° C. and salted out.

The structure formula of the product is:—

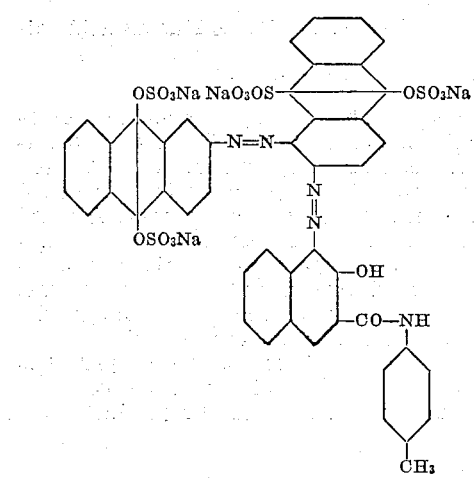

Example 17

This is a further example of the diazotization of an amino azo sulphuric acid ester.

58 parts of the amino azo body obtained by coupling diazotized paranitraniline with beta-amino-anthrahydroquinone disulphuric acid ester are dissolved in water and diazotized at 0–5° C. by the addition of 30 parts of concentrated hydrochloric acid and 6.9 parts of sodium nitrite. The diazo compound separates out as a gelatinous red mass and is added to a solution of 26.3 parts of the anilide of beta-hydroxy-naphthoic acid in 600 parts of 2% caustic soda. The dyestuff is isolated as previously described and is reddish-purple in color.

The structural formula of the product is:—

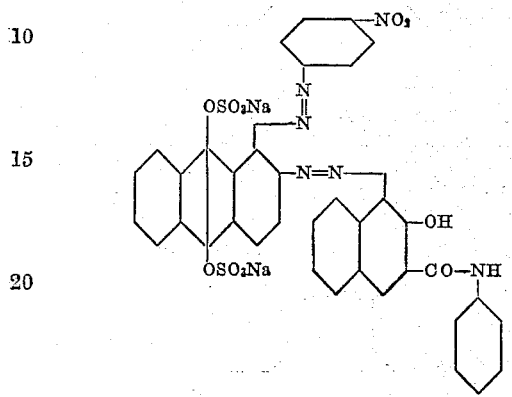

The following table which is that referred to above gives examples of some further dyestuffs:— bodies of which the structural formulæ are given below, namely:—

(a) Products having the following formula

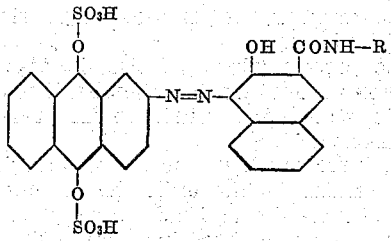

(b) Products having the following formula—

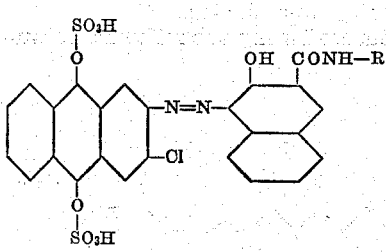

where R is an aromatic residue.

| Diazo compound | Phenol or amine | Color after development |
|---|---|---|
| Beta-diazo-anthrahydroquinone disulphuric acid ester | Phenol | Yellow |
| Beta-diazo-anthrahydroquinone disulphuric acid ester | Resorcinol | Yellow |
| Beta-diazo-anthrahydroquinone disulphuric acid ester | Beta-naphthylamine | Yellow |
| Beta-diazo-anthrahydroquinone disulphuric acid ester | Beta-hydroxy-naphthoic diaceto-acetic tolidide | Yellow |
| Beta-diazo-anthrahydroquinone disulphuric acid ester | Beta hydroxy-naphthoic acid | Red |
| Beta-diazo-anthrahydroquinone disulphuric acid ester | Beta-hydroxy-naphthoic anilide | Red |
| Beta-diazo-anthrahydroquinone disulphuric acid ester | Dianisidide of beta-hydroxy-naphthoic acid | Red |
| Beta-diazo-anthrahydroquinone disulphuric acid ester | Beta-hydroxy-naphthoic acid-alpha-naphthylide | Red |
| Beta-diazo-anthrahydroquinone disulphuric acid ester | Beta-hydroxynaphthoic acid beta-naphthylide | Red |
| Beta-diazo-anthrahydroquinone disulphuric acid ester | Ortho-anisidide of beta hydroxy naphthoic acid | Red |
| Beta-diazo-anthrahydroquinone disulphuric acid ester | Beta-hydroxy-naphthoic acid toluidide | Red |
| Beta-diazo-anthrahydroquinone disulphuric acid ester | Para-anisidide of beta-hydroxy-naphthoic acid | Red |
| Beta-diazo-anthrahydroquinone disulphuric acid ester | 2:5-dimethoxy-anilide of beta-hydroxy naphthoic acid | Red |
| 2-chlor-3-diazo-anthrahydroquinone disulphuric acid ester | 5-chlor-o-toluidide of beta-hydroxy naphthoic acid | Red |
| 2-chlor-3-diazo-anthrahydroquinone disulphuric acid ester | Para-anisidide of beta-hydroxy-naphthoic acid | Red |
| 2-chlor-3-diazo-anthrahydroquinone disulphuric acid ester | Beta-hydroxy-naphthoic anilide | Red |

| Diazo compound | Phenol | Color after development |
|---|---|---|
| 2-chlor-3-diazo-anthrahydroquinone disulphuric acid ester | Beta-hydroxy-naphthoic acid beta-naphthylide | Red |
| 2-chlor-3-diazo-anthrahydroquinone disulphuric acid ester | Ortho-anisidide of beta-hydroxy-naphthoic acid | Red |
| 2-chlor-3-diazo-anthrahydroquinone disulphuric acid ester | Dianisidide of beta-hydroxy-naphthoic acid | Red |
| 2-chlor-3-diazo-anthrahydroquinone disulphuric acid ester | Beta-hydroxy-naphthoic acid-alpha-naphthylide | Red |
| 2-chlor-3-diazo-anthrahydroquinone disulphuric acid ester | Beta-hydroxy-naphthoic acid toluidide | Red |
| 2:6-tetrazo-anthrahydroquinone-9:10-disulphuric acid ester | 5-chlor-o-toluidide of beta-hydroxy naphthoic acid | Red |
| Alpha-diazo-anthrahydroquinone-9:10-disulphuric acid ester | ......do...... | Red |
| 1-chlor-2-diazo-anthrahydroquinone-disulphuric acid ester | ......do...... | Red |

The invention is not limited to the above examples.

As regards the use of the coupled products, reference is made to our co-pending application referred to above.

The invention is not limited to any theory which may have been referred to herein.

The invention is of broad scope and includes specifically among other bodies the series of (c) Products having the following formula—

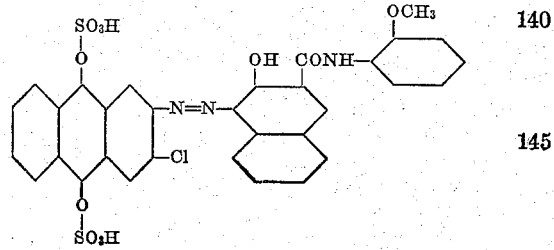

Having now described our invention, what we claim as new and desire to secure by Letters Patent is:—

1. The process which consists in diazotizing β-amino-anthrahydroquinone-disulphuric-acid-ester with nitrous acid.

2. The process which consists in diazotizing β-amino-anthra-hydro-quinone-disulphuric-acid-ester with sodium nitrite in the presence of hydrochloric acid.

3. The process which consists in bringing together 2-amino-3-chlor-anthrahydroquinone-disulphuric-acid-ester and a diazotizing agent.

4. A process as claimed in claim 3 which consists in bringing together the resulting product and a member of the group consisting of aromatic amines and phenols.

5. Products having the following formula:—

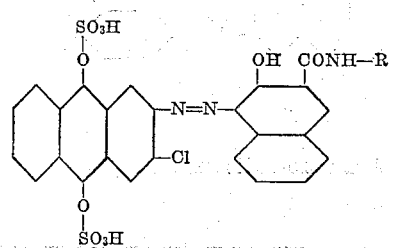

where R is an aromatic residue.

6. Products having the following formula:—

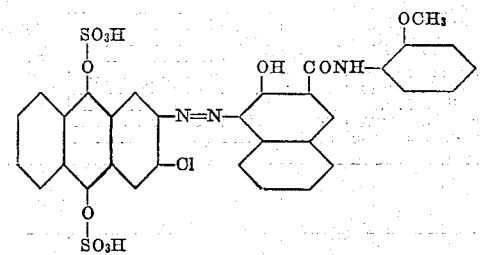

7. Compounds which are chloro-derivatives of the compound having the formula—

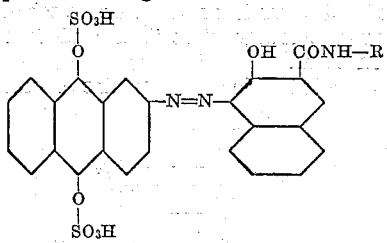

where R is an aromatic radical.

8. Compounds which are halogen-amino-sulpho- or nitro-derivatives of the compounds having the formula—

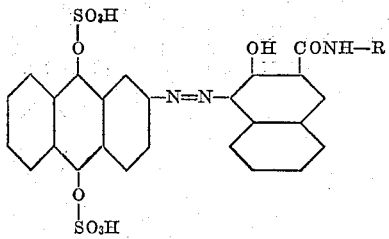

where R is an aromatic radical.

9. Products which are 9:10-disulphuric esters of β-hydroxynaphthoic acid arylide-azo-2-anthrahydroquinones.

10. β-diazoanthrahydroquinone disulphuric ester.

11. β-diazonium chloride of anthrahydroquinone disulphuric acid ester.

12. An azo dyestuff consisting of anthrahydroquinone disulphuric acid ester coupled through a diazo linkage in the β-position to an aromatic amine.

13. An azo dyestuff consisting of anthrahydroquinone disulphuric acid ester coupled through a diazo linkage in the β-position to an aromatic phenol.

14. 2-diazo-3-chloranthrahydroquinone disulphuric acid ester.

15. A process which consists in diazotizing an anthrahydroquinone disulphuric ester containing a diazoizable amino group.

DAVID ALEXANDER WHYTE
FAIRWEATHER.
J. THOMAS.